March 13, 1962  N. M. RASKHODOFF  3,024,629
PHASE CHANGING DEVICES
Filed May 13, 1959

INVENTOR
NICHOLAS M. RASKHODOFF

BY

ATTORNEY

United States Patent Office 3,024,629
Patented Mar. 13, 1962

3,024,629
PHASE CHANGING DEVICES
Nicholas M. Raskhodoff, 5728 Euclid St., Cheverly, Md.
Filed May 13, 1959, Ser. No. 812,857
1 Claim. (Cl. 64—24)

The present invention relates to what are known as timing or phasing devices and more particularly to phase changing devices of mechanical nature for bringing electrical or mechanical components into a timed relationship.

In certain arts and industries it is necessary to achieve a definite rotary angular or phasing relationship between shaft terminations of electrical or mechanical components in order to secure the desired performance or to achieve this in the manner described herein in preference to existing practices requiring more skill and yet not capable of providing the precise adjustment obtainable with this device. In certain applications in the aforementioned arts and industries such rotary angular relationship is extremely critical in order to obtain ultimate operation or peak performance. Consequently a slight rotary angular or phasing adjustment between such shaft terminations may result in achieving performance far out of proportion to the rotary angular displacement adjustment provided by this device. Or similarly, a rotary angular displacement of a gear in relation to its driving shaft by interposition of the device described herein between the gear and the driving shaft will serve to achieve peak performance from an electronic or mechanical component connected to other electronic or mechanical components through a gear train of which said gear is a part.

Heretofore accurate phasing alignment between such electronic devices as synchros has been accomplished by loosening the mounting clamps of one synchro unit and rotating its stator in the mounting relative to the stator of the other synchro left fixed in its mounting, a cumbersome procedure for obtaining accurate displacement and one difficult of application where synchro stators are difficult of access for such an adjustment.

Or in applications requiring phasing of an electronic or a mechanical device within a gear train, the procedure was to loosen the set screw holding the shaft termination gear of said device, manually rotating said shaft until adjustment was obtained, and then locking the gear to the shaft.

The present invention is an adjustable rotary angular mechanical drive adaptable for inclusion as an integral part of conventional types of mechanical couplings to provide required rotary angular or phasing displacement of one shaft hub, and the shaft attached to it, relative to the other shaft hub and the shaft attached to it. Or this drive can be made a part of a gear assembly whereby rotary angular or phase displacement between a gear and its driving shaft may be achieved. Means are provided in either case to lock the driven member of the mechanical drive to prevent displacement of the adjustment mechanism once the desired setting has been accomplished.

This invention overcomes the aforementioned disadvantage of phasing one synchro stator to the other by utilization of the adjustable phasing coupling, incorporating the phase changing device of this invention, by interposing said coupling between the synchro units, and merely turning the adjusting screw on said coupling until required phasing displacement of one shaft relative to the other is obtained.

Also, in gear applications requiring a phasing adjustment of an electronic or a mechanical device connected through its shaft to a gear train, incorporation of said mechanical drive of this invention as part of the phasing gear requires only the rotation of the adjusting screw to achieve an extremely accurate phasing displacement between the phasing gear and its shaft.

One of the chief objects of this invention is to provide a mechanical phase changing device of maximum simplicity in construction and operation, capable of being statically and dynamically balanced, and which can be quickly adjusted and locked in the adjusted position, to attain desired phasing displacement when integrated as part of a conventional mechanical coupling or of a gear driving assembly.

Another main object is to provide a mechanical phase changing device whose physical rotational inertia is reduced to such a value that its inclusion in the operating system does not affect the very low torque capacities of devices between whose shafts it is interposed.

Another object of this invention is to provide a mechanical phase changing device capable of adoption to various types of mechanical couplings or gears, which do not embody the rotary angular or phasing principle.

Still another object of this invention is to provide a mechanical phase changing device which incorporates a locking means capable of locking the adjustment throughout the angular rotational range of the device without disturbing the precise setting obtained with the adjustment means.

And yet another object of this invention is the method of manufacturing and assembling a mechanical phase changing device in accordance with details described hereafter.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
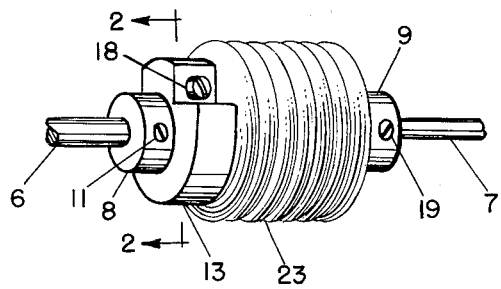
FIG. 1 is a perspective view of one form of a mechanical phase changing device as applied to one type of a conventional mechanical shaft coupling.

Referring now to the drawing, wherein like reference characters designate like or corresponding parts throughout the several views, there is shown in FIG. 1 a perspective view of the mechanical phasing mechanism as applied to a bellows type mechanical coupling where 6 is the driving shaft of an electronic or a mechanical device whose phase displacement it is desired to adjust relative to driven shaft 7 of another electronic or mechanical device.

A driving shaft coupling hub 8, a part of mechanical phasing mechanism described herein, serves as the attaching means from said phasing mechanism to driving shaft 8. Similarly, driven shaft coupling hub 9, attached to first end connection 33 of flexible bellows coupling member 23, serves as attaching means between said coupling member and driven shaft 7.

Located in coupling hub 8 is set screw 11 for locking coupling hub 8 to driving shaft 6, while set screw 19 in driven shaft coupling hub 9 locks shaft 7 to hub 9.

Figure 3:
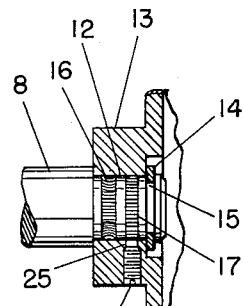
FIG. 3 is a more detailed sectional view showing one type of locking mechanism for the embodiment shown in FIGS. 1 and 2.

Shown in FIG. 3 is the coupling hub 8 which has a cylindrical extension 12 of a diameter smaller than hub 8 thereby providing a shoulder which bears against adjustment member 13 connected to coupling member 23 by second end connection 34 whereby extension 12 can rotate axially within member 13 and is restrained from longitudinal motion within member 13 by a retainer ring 14 contained within peripheral groove 15 at the free end of extension 12.

Located on outer periphery of extension 12, next to shoulder of hub 8, are worm gear teeth 16, generated by a spirally fluted tap capable of producing continuous cutting action on outer periphery of extension 12, such procedure resulting in decreases in overall length of extension 12 as compared to generation of said teeth by the conventional hobbing method.

Additionally, a serrated peripheral band 17 or the like is cut into the outer periphery of extension 12 between said teeth 16 and the end of extension.

Figure 2:
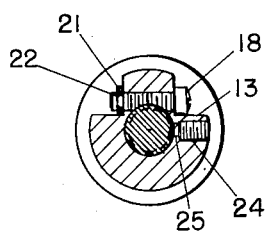
FIG. 2 is the end view sectional showing the driving mechanism of FIG. 1.

In FIG. 2 is shown adjusting screw 18 meshing with gear teeth 16 on the periphery of extension 12, said screw journaled within member 13 and restrained from longitudinal motion along its axis by retainer ring 21, positioned within peripheral groove 22 at the free end of screw 18 and bearing against member 13 at the retainer ring and head end.

Also shown in FIG. 3 is locking screw 24, locking washer 25 of soft material as nylon or the like, interposed between end of screw 24 and serrated peripheral band 17 on periphery of extension 12, said screw 24 being utilized for locking the adjustment mechanism.

Second end connection 34 of a coupling member such as flexible bellows 23 is attached to member 13 while first end connection 33 is attached to coupling hub 9.

Figure 4:
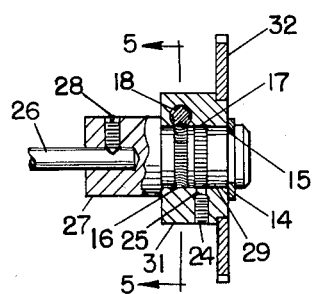
FIG. 4 is a sectional view of another embodiment of the device as applied to a gear.

FIG. 4 shows the application of this mechanical phase changing device to a phasing gear. Gear driving shaft 26 is attached to gear driving shaft hub 27 by a set screw 28 or the like. Hub 27 has a cylindrical extension 29 of a diameter smaller than hub 27 thereby providing a shoulder which bears against phasing gear hub 31 whereby extension 29 can rotate axially within gear hub 31 and is restrained from longitudinal motion within said hub 31 by a retainer ring 14 contained within peripheral groove 15 at the free end of extension 29.

Located on the outer periphery of extension 29, next to shoulder of hub 27, are worm gear teeth 16, generated by a spirally fluted tap capable of producing continuous cutting action on outer periphery of extension 29, such procedure resulting in decrease in overall length of extension 29 as compared to generation of said teeth by the conventional hobbing procedure.

Additionally, a serrated peripheral band 17 or the like is cut into the outer periphery of said extension 29 between said teeth 16 and the end of said extension.

Figure 5:
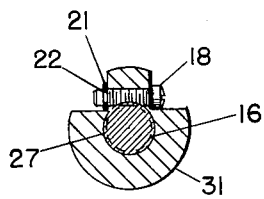
FIG. 5 shows the details of the adjusting screw used with the gear in the embodiment of FIG. 4.

In FIG. 5 is shown adjusting screw 18 meshing with gear teeth 16 on the outer periphery of extension 29, said screw journaled within phasing gear hub 31 and restrained from longitudinal motion along its axis by retainer ring 21 positioned within peripheral groove 22 located at the free end of screw 18 and bearing against hub 31 at said retainer ring and screw head end.

In FIG. 4 is shown locking screw 24, locking washer 25 of soft material as nylon or the like, interposed between end of screw 24 and serrated peripheral band 17 of said extension 29, said screw 24 being utilized for locking the adjustment mechanism.

The operation of this phase changing coupling device is as follows: rotating the adjusting screw 18, acting as the driving member, turns the cylindrical extension 12 and thereby the driving shaft coupling hub 8 and the driving shaft 6 connected to it. The opposite shaft hub 9 and driven shaft 7 connected to it remain stationary. The cylindrical extension 12 is locked to the adjustment member 13 by a locking screw 24 upon completion of adjustment. Similarly, rotating the adjusting screw 18, acting as the driving member, turns the cylindrical extension 29 of the gear driving shaft hub 27 and thereby the gear driving shaft 26 while the phasing gear 32 remains stationary. The locking procedure is the same as described for the adjustable coupling.

Thus this invention consists of a simple compact mechanical device, capable of providing a phasing displacement between shafts connected to its coupling hubs when such a device is incorporated as a part of a conventional mechanical coupling, or between a phasing gear and its driving shaft, accomplishing this without undue increase in the rotational load upon devices connected to such a phasing coupling or phasing gear, the method of generating teeth on the driven member by a spirally fluted tap in place of normal hobbing resulting in simpler manufacture and reduced length of driven member and thusly overall length of coupling or gear assembly, and with locking means between the adjustment member and the driven member without causing rotational movement of driven member during locking procedure.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention.

What I claim is:

A phase changing device comprising a driving shaft, a driven shaft, a flexible bellows coupling, said driving shaft to said driven shaft to transmit rotary motion with a minimum of backlash between said shafts, said coupling member disposed to rigidly interconnect a driven shaft hub to the driven shaft in at least one direction, said flexible bellows connected to an adjustment member disposed to accept a driving shaft hub with a stepped cylindrical extension, said extension including worm gear teeth cut on its periphery, said extension rotatable within said adjustment member and restricted from longitudinal motion, said adjustment member including an adjustment screw meshing with said worm gear teeth cut on said cylindrical extension such that said driving shaft hub is rotatable in response to rotation of said adjustment screw to produce mechanical phase displacement between said driven and driving shafts connected to said driven shaft hub and driving shaft hub respectively, said adjustment member including a locking means threaded in said member, a soft material locking washer, and a serrated peripheral band on said cylindrical extension, with said locking washer interposed between end of said locking screw and said peripheral band on said cylindrical extension of said driving shaft hub such that said cylindrical extension can be locked to said adjustment member.

References Cited in the file of this patent

UNITED STATES PATENTS

| | | |
|---|---|---|
| 628,060 | Zorn | July 4, 1899 |
| 892,623 | Richards | July 7, 1908 |
| 1,138,799 | Scott | May 11, 1915 |
| 1,471,143 | Cromwell | Oct. 16, 1923 |
| 1,518,109 | Rankin | Dec. 2, 1924 |
| 1,691,408 | Palmer | Nov. 13, 1928 |
| 2,469,570 | Parish | May 10, 1949 |
| 2,870,617 | Peters | Jan. 27, 1959 |

FOREIGN PATENTS

| | | |
|---|---|---|
| 192,295 | Great Britain | Feb. 1, 1923 |
| 208,875 | Great Britain | Jan. 3, 1924 |